(12) United States Patent
Makino (10) Patent No.: US 10,088,354 B2
(45) Date of Patent: Oct. 2, 2018

(54) INTEGRATED DEVICE ATTACHED TO WINDSHIELD HAVING SUNLIGHT LENS PORTION WITH A PEAK ADJUSTMENT PORTION

(71) Applicant: DENSO CORPORATION, Kariya, Aichi-pref. (JP)

(72) Inventor: Kazuki Makino, Kariya (JP)

(73) Assignee: DENSO CORPORATION, Kariya (JP)

( * ) Notice: Subject to any disclaimer, the term of this patent is extended or adjusted under 35 U.S.C. 154(b) by 67 days.

(21) Appl. No.: 15/123,268

(22) PCT Filed: Mar. 24, 2015

(86) PCT No.: PCT/JP2015/001668
§ 371 (c)(1),
(2) Date: Sep. 2, 2016

(87) PCT Pub. No.: WO2015/146152
PCT Pub. Date: Oct. 1, 2015

(65) Prior Publication Data
US 2017/0067776 A1    Mar. 9, 2017

(30) Foreign Application Priority Data

Mar. 25, 2014 (JP) .................................. 2014-61443

(51) Int. Cl.
*B60R 11/04* (2006.01)
*G01J 1/02* (2006.01)
(Continued)

(52) U.S. Cl.
CPC ............. *G01J 1/0411* (2013.01); *B60R 11/04* (2013.01); *G01J 1/02* (2013.01); *G01J 1/0266* (2013.01);
(Continued)

(58) Field of Classification Search
CPC ............. G01J 2001/4266; G01J 1/4228; G01J 1/0266; G01J 1/0411; G01J 1/0271; B60R 11/04
(Continued)

(56) References Cited

U.S. PATENT DOCUMENTS 6,376,824 B1    4/2002  Michenfelder et al.
6,521,882 B1 *  2/2003  Sumiya ..................... G01J 1/04
                                                    250/203.4
(Continued)

FOREIGN PATENT DOCUMENTS

JP    H08-021765 A    1/1996

*Primary Examiner* — Que T Le
(74) *Attorney, Agent, or Firm* — Posz Law Group, PLC (57) ABSTRACT

A sunlight lens portion includes a low elevation angle surface for capturing light at low elevation angles, an opposing surface which is adjacent to the low elevation angle surface and which faces a sunlight detection element, and a high elevation angle surface for capturing light at high elevation angles. Further, the sunlight lens portion includes a reflection surface adjacent to the high elevation angle surface and the opposing surface. Accordingly, a portion of sunlight entering the sunlight lens portion is reflected by the reflection surface and guided to the sunlight detection element, therefore it is possible to broaden a range of peak sunlight amount detected by the sunlight detection element. Due to this, it is possible to reduce an effect of the angle of inclination of the windshield on the elevation angle characteristic of the sunlight sensor.

7 Claims, 5 Drawing Sheets

(51) Int. Cl.
*G01J 1/04* (2006.01)
*G01J 1/42* (2006.01)
*B60R 11/00* (2006.01)

(52) U.S. Cl.
CPC .......... *G01J 1/0271* (2013.01); *G01J 1/0407* (2013.01); *B60R 2011/0026* (2013.01); *G01J 2001/0485* (2013.01); *G01J 2001/4266* (2013.01)

(58) Field of Classification Search
USPC .............................. 250/203.4, 227.25, 205
See application file for complete search history.

(56) References Cited

U.S. PATENT DOCUMENTS

| | | |
|---|---|---|
| 2006/0006318 A1 | 1/2006 | Ishikawa et al. |
| 2015/0062569 A1 | 3/2015 | Sugiura et al. |

\* cited by examiner

FIG. 9

INTEGRATED DEVICE ATTACHED TO WINDSHIELD HAVING SUNLIGHT LENS PORTION WITH A PEAK ADJUSTMENT PORTION

CROSS-REFERENCE TO RELATED APPLICATIONS

The present application is a U.S. national stage of International Application No. PCT/JP2015/001668 filed on Mar. 24, 2015 and is based on Japanese patent application No. 2014-61443 filed on Mar. 25, 2014, the content of which is incorporated herein by reference.

TECHNICAL FIELD

The present disclosure relates to an integrated device in which a sunlight sensor is integrated with an in-vehicle product.

BACKGROUND ART

Conventionally, a light sensor of several integrated sensors is proposed by, for example, Patent Literature 1, Specifically, a configuration in which a rain sensor is integrated with an ambient light sensor is proposed. The light sensor is mounted to the windshield of a vehicle. Then, the rain sensor measures changes in the intensity of light by detecting changes in refractive property caused by raindrops adhering to the windshield. In addition, the ambient light sensor detects the brightness of ambient light irradiated from outside through the windshield.

PRIOR ART LITERATURE

Patent Literature

Patent Literature 1: JP 4570698 B

SUMMARY OF THE INVENTION

The present inventor considered a sunlight sensor that detects an amount of sunlight entering a vehicle cabin by detecting the amount of sunlight according to a predetermined elevation angle characteristic. Further, the sunlight sensor is mounted in a dashboard of the vehicle.

In addition, as described above, the sunlight sensor may be integrated with a rain sensor in a single package. However, the angle of inclination of the windshield with respect to the ground surface differs for each vehicle type. Accordingly, there is a concern that the angle of inclination of the windshield may affect the elevation angle characteristic of the sunlight sensor.

Specifically, if the sunlight sensor is mounted on a windshield with a small angle of inclination, the sunlight sensor is able to capture light from above the vehicle. However, it may be difficult for the sunlight sensor to capture light from the front of the vehicle. Conversely, if the sunlight sensor is mounted on a windshield with a large angle of inclination, the sunlight sensor is able to capture light from the front of the vehicle. However, it may be difficult for the sunlight sensor to capture light from above the vehicle.

It should be noted that the sunlight sensor may be integrated with in-vehicle products other than a rain sensor. In other words. In other words, the above described situation may occur when the sunlight sensor is integrated with an in-vehicle product mounted on the windshield.

In view of the above points, it is an object of the present disclosure to provide an integrated device in which a sunlight sensor is integrated with an in-vehicle product mounted on a windshield, and in which the angle of inclination of the windshield has a reduced effect on the elevation angle characteristic of the sunlight sensor.

According to one aspect of the present disclosure, an integrated device comprises an in-vehicle product fixed to a windshield of a vehicle, and a sunlight sensor integrated with the in-vehicle product. The sunlight sensor includes a sunlight detection element that detects a sunlight amount by receiving sunlight entering the windshield, and a sunlight lens portion that guides the sunlight entering the windshield over a predetermined elevation angle range into the sunlight detection element such that the sunlight detection element detects a peak of the sunlight amount at a particular angle within the elevation angle range.

Further, the sunlight lens portion includes a peak adjustment portion that adjusts the sunlight amount to be constant over a prescribed range within the elevation angle range, the prescribed range including the particular angle.

Accordingly, the peak adjustment portion broadens the range of the peak of the sunlight amount in the elevation angle range, and so it is possible to have the necessary elevation angle characteristic even considering differences in the angle of inclination of the windshield of the vehicle. In other words, the sunlight sensor may be applied to windshields with various angles of inclination. Accordingly, it is possible to reduce an effect of the angle of inclination of the windshield on the elevation angle characteristic of the sunlight sensor.

EMBODIMENTS FOR CARRYING OUT INVENTION

Hereinafter, embodiments of the present disclosure will be explained with reference to the figures. In addition, portions of each embodiment which are the same or equivalent to each other are denoted with the same reference numeral in the figures.

(First Embodiment)

Figure 1:
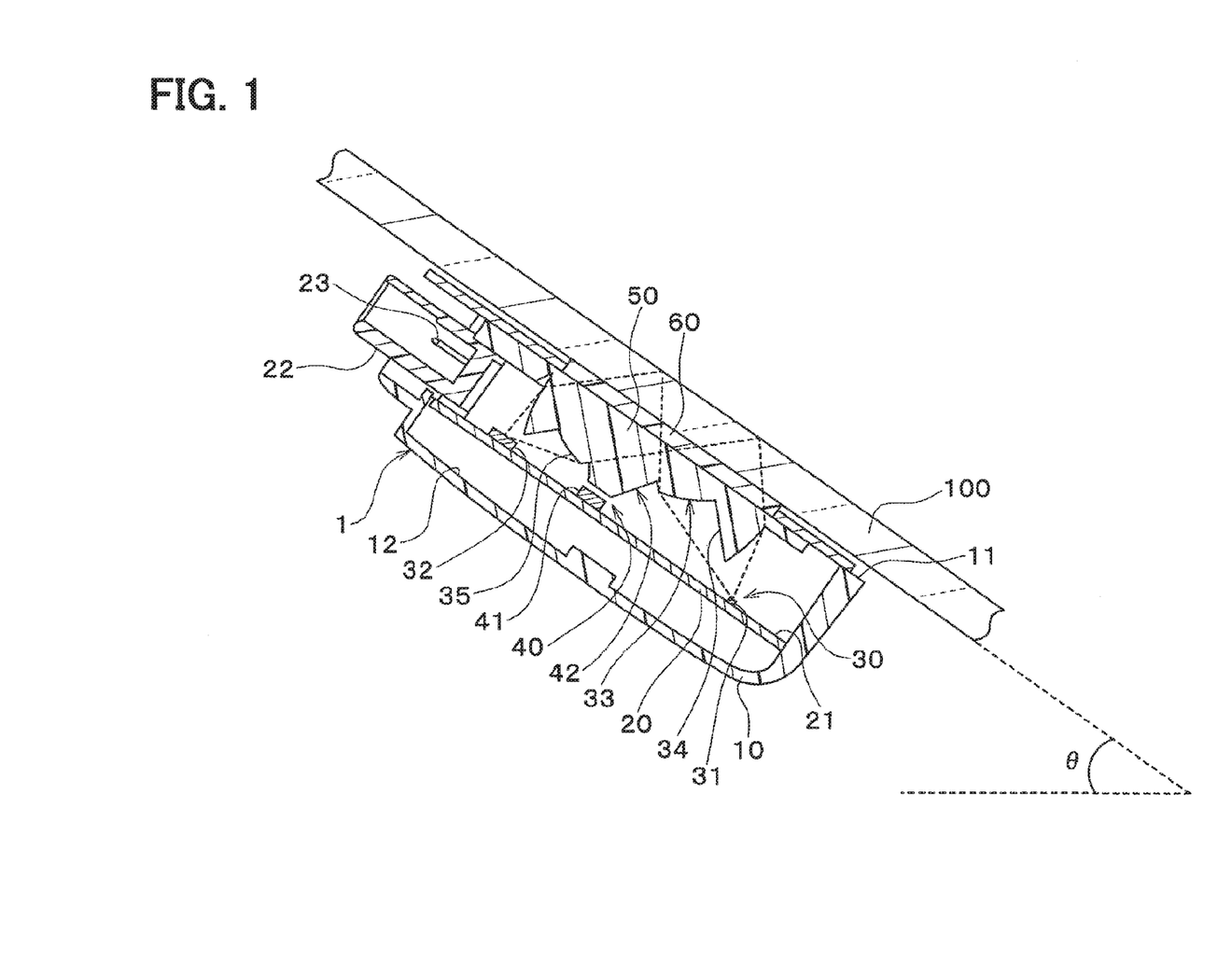
FIG. 1 is a cross section view of an integrated device according to a first embodiment of the present disclosure.

A first embodiment of the present disclosure will be explained with reference to the figures. An integrated device according to the present embodiment includes, for example, a rain sensor integrated with a sunlight sensor. The rain sensor detects raindrops adhering to a windshield of a vehicle, and the sunlight sensor detects an amount of sunlight around the vehicle. As shown in FIG. 1, an integrated device 1 is disposed on the vehicle cabin side of a windshield 100. The windshield 100 has a vehicle glass angle θ which differs for each vehicle type.

The integrated device 1 includes a cover housing 10, a circuit substrate 20, a rain sensor 30, and a sunlight sensor 40. The rain sensor 30 includes a light emission element 31, a light reception element 32, and a light guiding lens portion 33. Further, the sunlight sensor 40 includes a sunlight detection element 41 and a sunlight lens portion 42.

The cover housing 10 forms the exterior of the integrated device. The cover housing 10 is a case that houses the circuit substrate 20, the rain sensor 30, and the sunlight sensor 40. The cover housing 10 is formed of a metal or resin material. When viewed from an opening end 11 toward a bottom surface 12, the cover housing 10 may have, for example, a rectangular outline.

In addition, the cover housing 10 is mounted to a bracket (not illustrated) fixed to the windshield 100. As a result, the cover housing 10 forms a housing body together with the bracket. Further, the bracket may be, for example, pressed into a predetermined shape from a metal sheet, and be fixed to the windshield 100 by an adhesive.

The light emission element 31 and the light reception element 32 of the rain sensor 30, together with the sunlight detection element 41 of the sunlight sensor 40, are mounted on the circuit substrate 20. The circuit substrate 20 is flat shaped, and includes a first surface 21. The circuit substrate 20 may be, for example, a printed circuit board.

In addition, a connector 22 and other non-illustrated electronic components are mounted on the first surface 21 of the circuit substrate 20. The connector 22 is made of resin, and is connected to a wiring connector (not illustrated). The connector 22 includes a terminal 23 which is electrically connected to a circuit formed on the circuit substrate 20. The terminal 23 is formed as an insert in the connector 22. The electronic components include, for example, integrated circuits, resistive elements, and chip capacitors. The circuit substrate 20 is housed near the bottom surface 12 of the cover housing 10 such that the first surface 21 faces the opening end 11 of the cover housing 10.

The rain sensor 30 is configured to detect raindrops adhering to the windshield 100 of the vehicle. The integrated device 1 includes the rain sensor 30 integrated with the sunlight sensor 40. In other words, the components which constitute the integrated device 1, such as the cover housing 10 and the circuit substrate 20, also constitute the rain sensor 30.

The light emission element 31 irradiates a measurement light for detecting raindrops adhering to the windshield 100. The light emission element 31 includes a light emitting diode (LED) and a drive circuit (not illustrated). The LED emits light toward the windshield 100, and the drive circuit drives this LED. The drive circuit may drive the LED through, for example. PWM control. In other words, the drive circuit emits a pulse signal to cause the LED to switch on and off. Of course, the LED may be drive with a constant voltage as well. In addition, the light emission element 31 may be provided by, for example, a semiconductor chip.

The light reception element 32 receives light reflected at the windshield 100. The light reception element 32 includes a photodiode (PD) and a processing circuit (not illustrated). The PD detects an intensity of the received light, and the processing circuit performs amplification, etc., on a signal from this PD. In addition, the light reception element 32 is mounted a fixed distance away from the light emission element 31 on the first surface 21 of the circuit substrate 20. Further, the light reception element 32 may be provided by, for example, a semiconductor chip.

The light guiding lens portion 33 guides the light emitted by the light emission element 31 to the windshield 100, and guides the light reflected at the windshield 100 to the light reception element 32. In this regard, the light guiding lens portion 33 includes a first lens portion 34 and a second lens portion 35.

The first lens portion 34 forms one section of the light guiding lens portion 33, and collects light from the light emission element 31. The first lens portion 34 is housed in the cover housing 10 so as to face the light emission element 31. Further, the second lens portion 35 collects the reflected light, which is reflected at the windshield 100, into the light reception element 32. The second lens portion 35 is housed in the cover housing 10 so as to face the light reception element 32.

According to the above configuration, the light emitted from the light emission element 31 is guided through the first lens portion 34 of the light guiding lens portion 50 into the windshield 100, and then is reflected by the windshield 100. Further, the light reflected at the windshield 100 is guided through the second lens portion 35 of the light guiding lens portion 33 into the light reception element 32. In this configuration, the light refraction characteristic of the windshield 100 changes due to raindrops adhering to the windshield 100, and thus the intensity of light detected by the light reception element 32 changes. Accordingly, the present of raindrops adhering to the windshield 100 may be detected by the rain sensor 30 based on the intensity of light received by the light reception element 32.

The sunlight sensor 40 detects a sunlight amount from the sun. The sunlight detection element 41 of the sunlight sensor 40 detects the sunlight amount by receiving sunlight entering the windshield 100. The sunlight detection element 41 includes a photodiode (PD) that detects the intensity of received light, and a processing circuit (not illustrated) that obtains the sunlight amount based on a signal from this PD. In addition, the sunlight detection element 41 is disposed between the light emission element 31 and the light reception element 32 of the rain sensor 30 on the first surface 21 of the circuit substrate 20. Further, the sunlight detection element 41 may be provided by, for example, a semiconductor chip.

Figure 2:
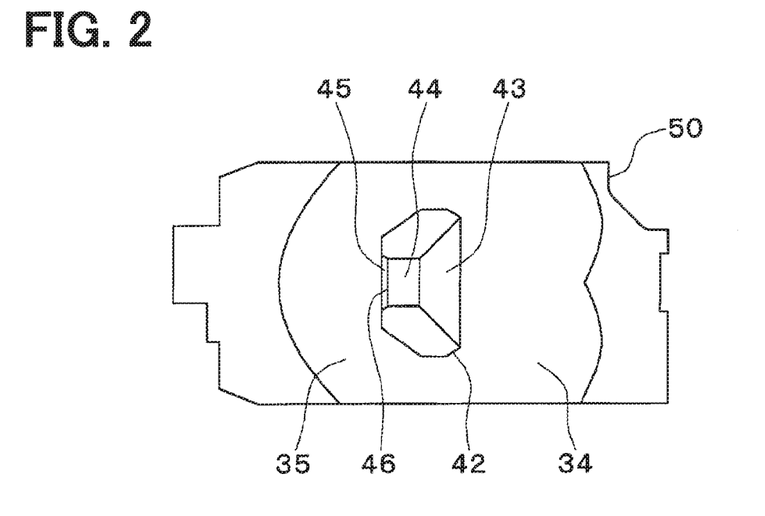
FIG. 2 is a plane view of a light guiding lens portion integrated with a sunlight lens portion.

The sunlight lens portion 42 guides, to the sunlight detection element 41, sunlight which enters the windshield 100 within a predetermined range of elevation angles. The sunlight lens portion 42 is housed within the cover housing 10 so as to face the sunlight detection element 41. As shown in FIG. 2, the sunlight lens portion 42 is disposed between the first lens portion 34 and the second lens portion 35 of the light guiding lens portion 33.

According to the above configuration, the light guided into the sunlight lens portion 42 is guided to the sunlight detection element 41. As a result, the sunlight detection element 41 detects a received amount of sunlight from the sun.

Further, the sunlight lens portion 42 is integrally formed with the light guiding lens portion 33. In other words, the light guiding lens portion 33 and the sunlight lens portion 42 are formed of a single mold. Since the sunlight lens portion 42 is integrally formed with the light guiding lens portion 33, it is not necessary to consider a design for joining the sunlight lens portion 42 with the light guiding lens portion 33. In other words, the sunlight lens portion 42 and the light guiding lens portion 33 may be designed in an easier manner.

Accordingly, the sunlight lens portion 42 and light guiding lens portion 33 form a single lens 50. This lens 50 is housed within the cover housing 10 so as to be above the first surface 21 of the circuit substrate 20. In addition, a surface of the lens 50 opposite to the first lens portion 34, the second lens portion 35, and the sunlight lens portion 42 is formed as a flat surface.

In addition, as shown in FIG. 1, a sheet 60 is attached to the flat surface portion of the lens 50. The sheet 60 is in contact with both the lens 50 and the windshield 100. In addition, light from the windshield 100 is captured by the lens 50 through the sheet 60.

The above explanation is for the overall configuration of the integrated device 1 according to the present embodiment. The detection results of the rain sensor 30 and the sunlight sensor 40 are output to an external device through the connector 22.

Figure 3:
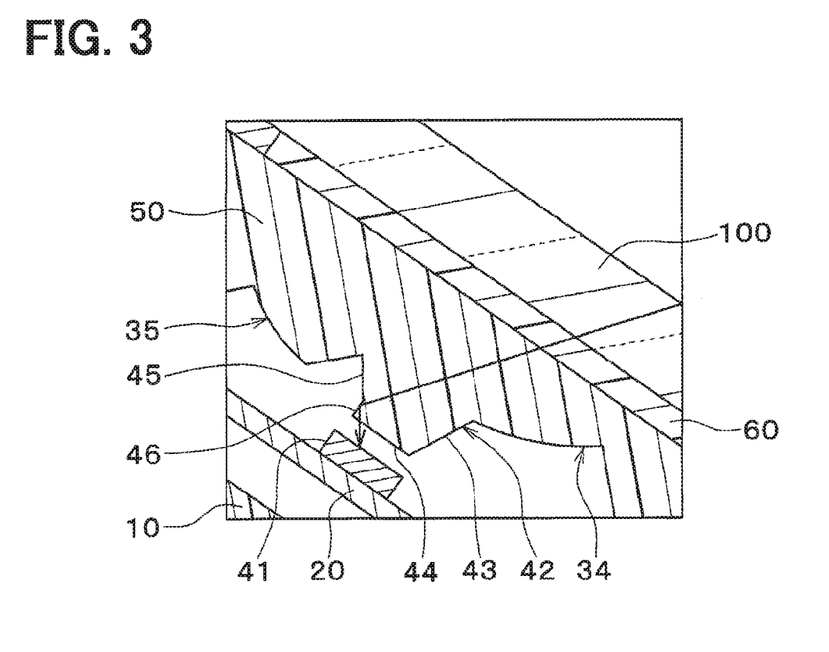
FIG. 3 is an expanded cross section view of a sunlight sensor in an integrated sensor.

Next, the specific configuration of the sunlight lens portion 42 will be explained. First, as shown in FIG. 3, the sunlight lens portion 42 protrudes out toward the sunlight detection element 41. Further, as shown in FIGS. 2 and 3, the sunlight lens portion 42 includes a low elevation angle surface 43, an opposing surface 44, and a high elevation angle surface 45. In addition, the cross section view of FIG. 3 shows a cross section of the sunlight lens portion 42 which is parallel to the direction of the angle of the elevation angle. The same applies to FIG. 1.

The low elevation angle surface 43 is for capturing light from low angles of elevation within a range of elevation angles. The opposing surface 44 is adjacent to the low elevation angle surface 43, and faces the sunlight detection element 41. As shown in FIG. 2, the opposing surface 44 has a rectangular shape, and is sized according to elevation angle characteristics. Further, the high elevation angle surface 45 is for capturing light from high angles of elevation within the range of elevation angles.

Further, as shown in FIG. 3, according to the present embodiment, the sunlight lens portion 42 includes a reflection surface 46 adjacent to the high elevation angle surface 45 and the opposing surface 44. This reflection surface 46 is for reflecting a portion of the light that enters the sunlight lens portion 42, and guides this light into the sunlight detection element 41. The reflection surface 46 is connected to the opposing surface 44 with an acute angle, and is connected to the high elevation angle surface 45 with an obtuse angle. Here, "obtuse angle" and "acute angle" refer to the angles formed by the lens sections of the sunlight lens portion 42. Further, the opposing surface 44 and the low elevation angle surface 43 are connected by an obtuse angle.

Next, the operation effects of the reflection surface 46 of the sunlight lens portion 42 will be explained. First, the sunlight lens portion 42 guides light into the sunlight detection element 41 by way of the low elevation angle surface 43 and the high elevation angle surface 45, and therefore has a peak sunlight amount at a predetermined angle within the range of elevation angles. However, the sunlight lens portion 42 includes the reflection portion 46 adjacent to the high elevation angle surface 45 and the opposing surface 44. For this reason, low elevation angle light reflected by the reflection surface 46 is added, and it is possible to increase a range over which the sunlight detection element 41 detects a peak sunlight amount at low elevation angles.

Figure 4:
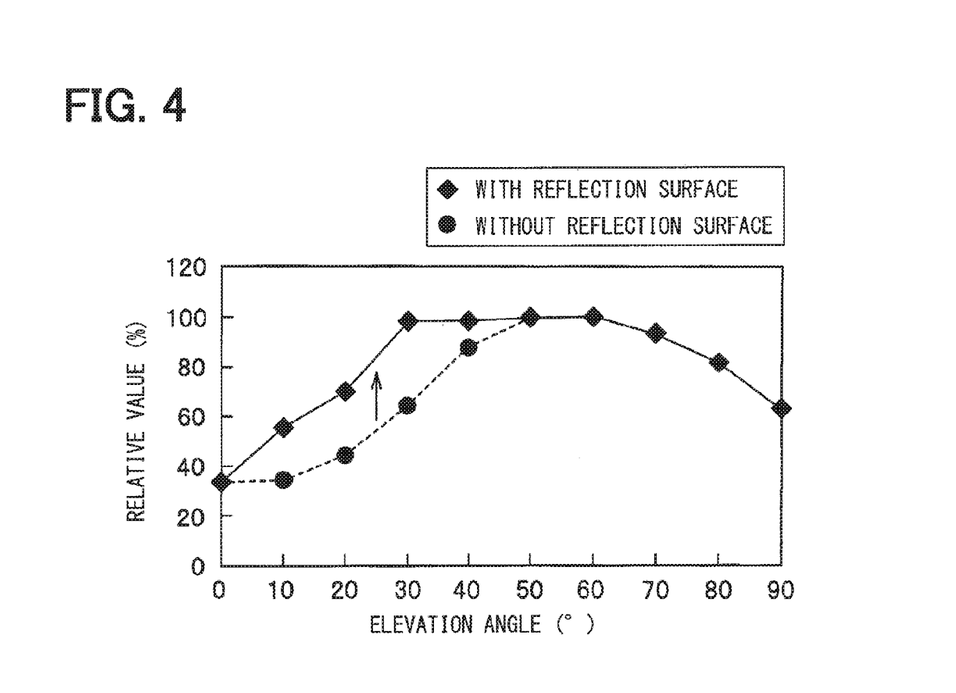
FIG. 4 is a view for explaining an elevation angle characteristic obtained by a reflection surface of a sunlight lens portion.

Specifically, as shown in FIG. 4, if the sunlight lens portion 42 did not include the reflection surface 46, the sunlight amount peaks at an elevation angle of around 45°. Conversely, when the sunlight lens portion 42 includes the reflection surface 46, low elevation angle sunlight reflected by the reflection surface 46 is added, and the relative amount of sunlight at low elevation angles is increased. In other words, light is able to enter over a wider range of angles. Accordingly, it is possible to capture a constant amount of sunlight over a predetermined range of elevation angles including a particular angle (such as 45°).

Further, according to FIG. 4, the amount of sunlight is shown as a relative value for each angle with respect to the amount of sunlight at 45°, as an example. Further, FIG. 4 show an elevation angle characteristic measured when the integrated device 1 is mounted on a windshield with a vehicle glass angle of 35°.

As described above, the reflection surface 46 functions as a peak adjustment portion that sets a constant amount of sunlight over a predetermined range of elevation angles including a particular angle (such as 45°). In the present embodiment, a constant amount of sunlight may be captured over, for example, an elevation angle range of 30° to 60°. The elevation angle range of constant sunlight amount may be suitably adjusted according to the shape, surface area, etc. of the reflection surface 46.

In this regard, the elevation angle characteristic of the sunlight lens portion 42 may be adjusted by the reflection surface 46. Accordingly, it is possible to apply the sunlight sensor 40 to windshields 100 with various angles of inclination. Therefore, it is possible to reduce the effect of the angle of inclination of the windshield 100 on the sunlight sensor 40.

Further, according to the present embodiment, the sunlight lens portion 42 is disposed between the first lens portion 34 and the second lens portion 35 of the rain sensor 30. Accordingly, it is possible to miniaturize the size of the integrated device 1. Further, light may be captured into the sunlight lens portion 42 through all portions of the lens 50 which function as the rain sensor 30.

Further, the rain sensor 30 of the present embodiment corresponds to an "in-vehicle product". In addition, the reflection surface 46 of the present embodiment corresponds to a "peak adjustment portion".

(Second Embodiment)

Figure 5:
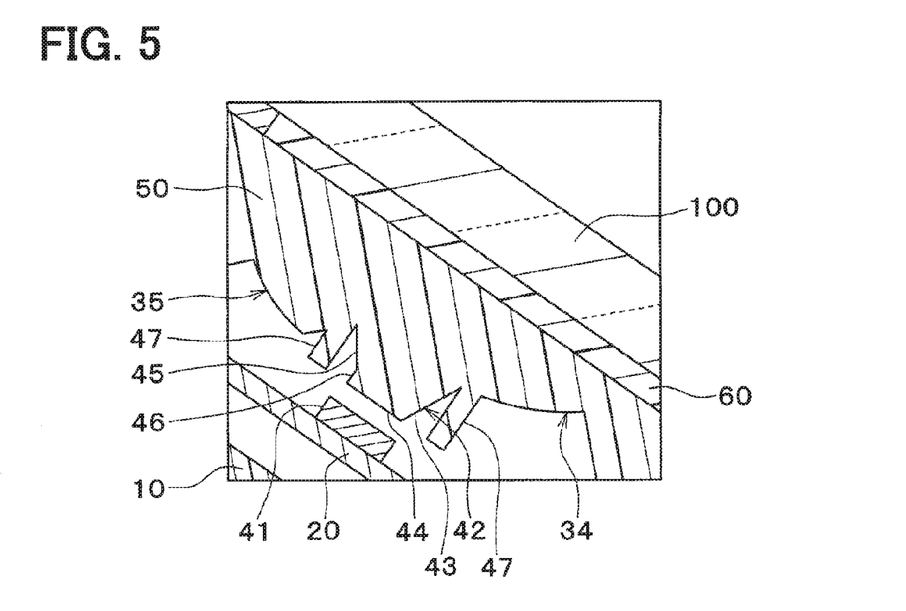
FIG. 5 is a cross section view of a sunlight lens portion according to a second embodiment of the present disclosure.

The present embodiment will be explained with reference to portions which differ from the first embodiment. As shown in FIG. 5, the lens 50 includes a wall portion 47. In the present embodiment, the wall portion 47 is disposed between the first lens portion 34 and the sunlight lens portion 42, and is disposed between the sunlight lens portion 42 and the second lens portion 35.

In this regard, since the wall portion 47 is disposed between the first lens portion 34 and the sunlight lens portion 42, the wall portion 47 is able to block light approaching from the first lens portion 34 toward the sunlight detection element 41. Further, since the wall portion 47 is disposed between the sunlight lens portion 42 and the second lens portion 35, the wall portion 47 is able to block light approaching from the second lens portion 35 toward the sunlight detection element 41. Accordingly, unnecessary light is obstructed by the wall portion 47 from being guided into the sunlight detection element 41, and the detection accuracy of the sunlight sensor 40 may be improved.

(Third Embodiment)

Figure 6:
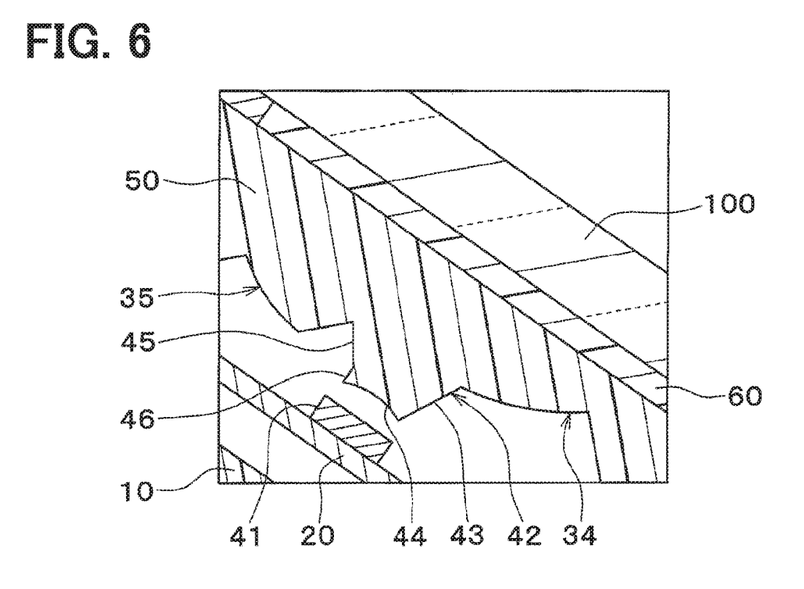
FIG. 6 is a cross section view of a sunlight lens portion according to a third embodiment of the present disclosure.

The present embodiment will be explained with reference to portions which differ from the first and second embodiments. As shown in FIG. 6, the opposing surface 44 of the sunlight lens portion 42 is a concave spherical surface such that the cross section of the sunlight lens portion 42, as viewed along a surface forming the elevation angle of the sunlight detection element 41, is spaced away from the sunlight detection element 41.

Further, a "surface forming the angle of inclination of the windshield 100" is defined as a triangular cross section which is sectioned such that the inclined surface of the windshield 100 and the horizontal plane are included in the connection points of each surface. In other words, this surface is perpendicular to the ground surface, and runs along the traveling direction of the vehicle.

Here, the cross section shape of the opposing surface 44 of the sunlight lens portion 42 is a spherical surface, but the overall opposing surface 44 has, for example, an inverted cylindrical shape or an inverted bowl shape. Here, "bowl shape" refers to a portion of the outer surface of a sphere, and refers to the shape of a contact lens.

From the above, by adjusting the shape of the opposing surface 44 of the sunlight lens portion 42, the constant region of the peak of the sunlight amount may be finely adjusted.

(Fourth Embodiment)

Figure 7:
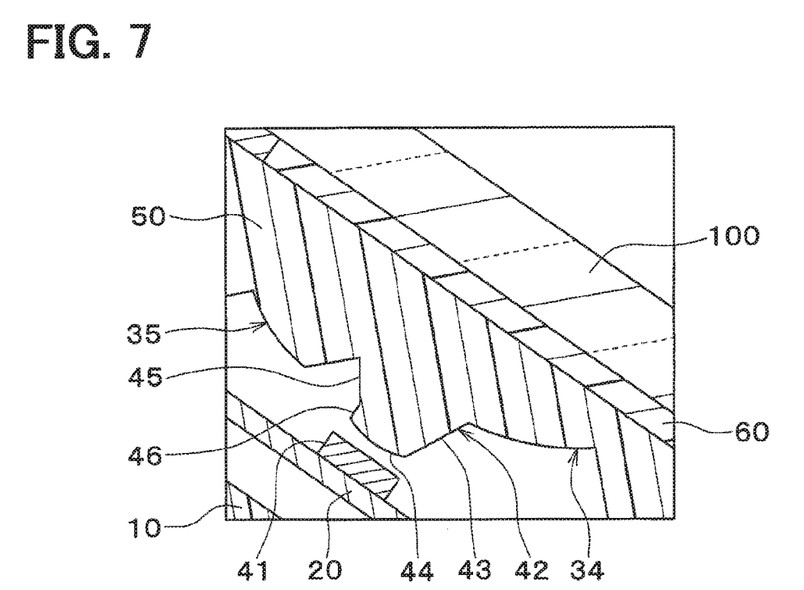
FIG. 7 is a cross section view of a sunlight lens portion according to a fourth embodiment of the present disclosure.

The present embodiment will be explained with reference to portions which differ from the third embodiment. As shown in FIG. 7, the opposing surface 44 of the sunlight lens portion 42 is shaped such that the cross section of the sunlight lens portion 42, as viewed along a surface forming the elevation angle of the sunlight detection element 41, is spherical shaped and protrudes toward the sunlight detection element 41. Further, the entire opposing surface 44 of the sunlight lens portion 42 may have, for example, a protruding cylindrical shape or a protruding bowl shape. Accordingly, similar to the third embodiment, the constant region of the peak of the sunlight amount may be finely adjusted.

(Fifth Embodiment)

The present embodiment will be explained with reference to portions which differ from the first to third embodiments. In each of the above described embodiments, the region of peak sunlight amount is broadened by increasing the light captured at low elevation angles. However, according to the present embodiment, the region of peak sunlight amount is broadened by decreasing the light captured at high elevation angles.

Figure 8:
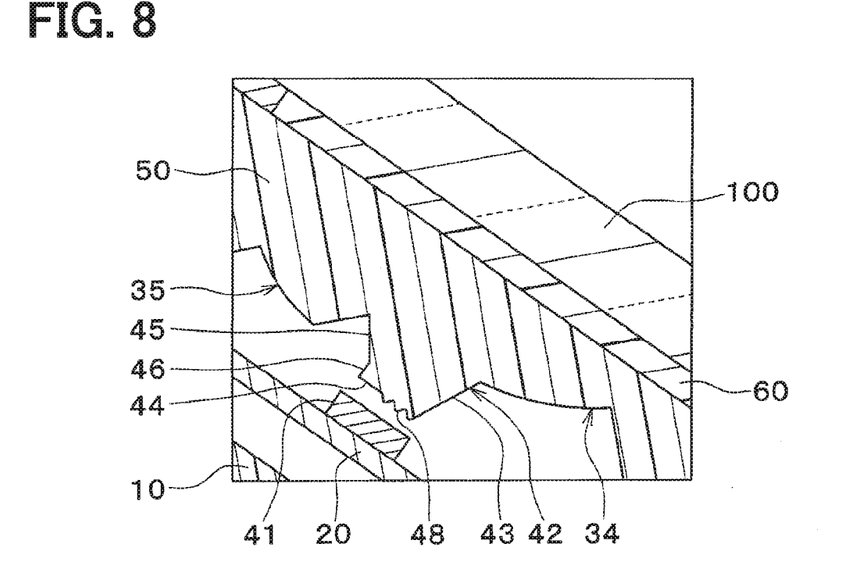
FIG. 8 is a cross section view of a sunlight lens portion according to a fifth embodiment of the present disclosure.

Specifically, as shown in FIG. 8, the sunlight lens portion 42 includes a low elevation angle surface 43, an opposing surface 44, and a high elevation angle surface 45. The opposing surface 44 is adjacent to both the low elevation angle surface 43 and the high elevation angle surface 45.

In addition, the opposing surface 44 includes an uneven portion 48. The uneven portion 48 is formed in the opposing surface 44 closer toward the low elevation angle surface 43. The uneven portion 48 may be formed by, for example, light irradiation by plasma irradiation or UV irradiation, emboss processing, etc. Further, the uneven portion 48 may be formed by rubbing a portion of the opposing surface 44 with, for example, sandpaper. In other words, the uneven portion 48 may be referred to as a roughened portion of the opposing surface 44.

Figure 9:
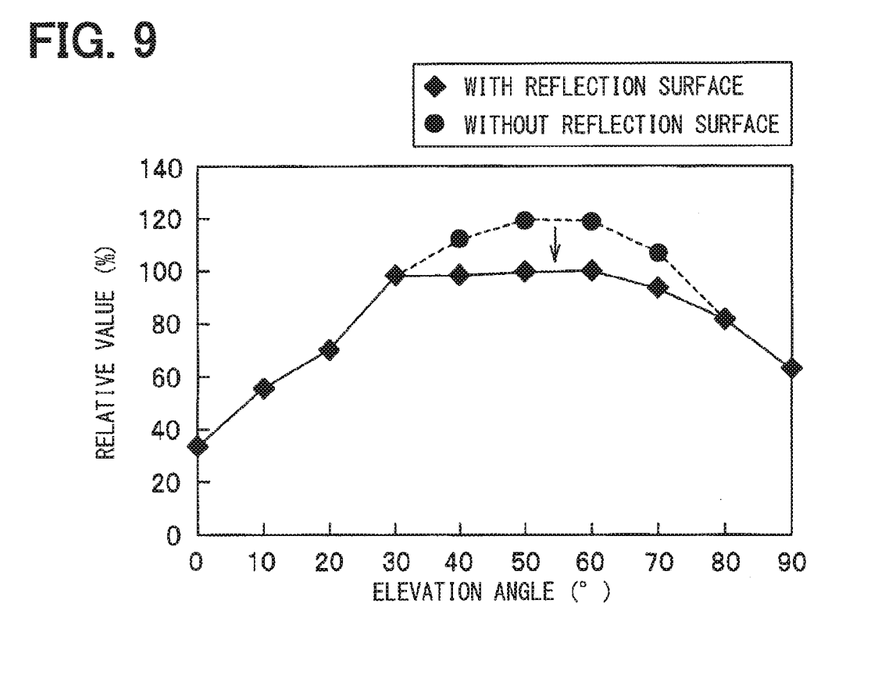
FIG. 9 is a view for explaining an elevation angle characteristic obtained by an uneven portion of an opposing surface of a sunlight lens portion.

Next the operation effects of the uneven portion 48 will be explained. As shown in FIG. 9, if the sunlight lens portion 42 did not include the uneven portion 48, the sunlight amount peaks at an elevation angle of around 45°, Conversely, when the opposing surface 44 of the sunlight lens portion 42 includes the uneven portion 48, high elevation angle sunlight is scattered by the uneven portion 48, and it is more difficult for the sunlight detection element 41 to detect high elevation angle sunlight.

In this regard, the amount of high elevation angle sunlight, which is scattered by the uneven portion 48, decreases, and so the relatively value at high elevation angles decreases. Accordingly, it is possible to broaden the range over which the sunlight detection element 41 detects a peak amount of sunlight. As described above, the uneven portion 48 functions as a peak adjustment portion that sets a constant amount of sunlight over a predetermined range of elevation angles including a particular angle (such as) 45°.

Further, the uneven portion 48 of the present embodiment corresponds to a "peak adjustment portion".

(Other Embodiments)

In each of the above described embodiments, the configuration of the integrated device 1 is exemplary. The integrated device 1 is not limited to the above configurations, and may be implemented in other ways according to the present disclosure. For example, the in-vehicle product which is integrated with the sunlight sensor 40 is not limiting to the rain sensor 30, and may be other in-vehicle products such as a laser radar.

Further, the light guiding lens portion 33 and the sunlight lens portion 42 may be separately provided. In this case, for example the sunlight lens portion 42 may be attached to the light guiding lens portion 33, or the light guiding lens portion 33 may be attached to the sunlight lens portion 42. Further, the sunlight detection element 41 may be disposed at locations other than between the light emission element 31 and the light reception element 32.

In order to adjust the peak sunlight amount to be constant, the sunlight lens portion 42 may include both the reflection surface 46 described in the first embodiment and the uneven portion 48 described in the fifth embodiment. Further, the uneven portion 48 disposed in the opposing surface 44 may be disposed over the entirety of the opposing surface 44, instead of only a portion of the opposing surface 44. In this case, the scattering effect of the uneven portion 48 may be adjusted such that the dispersion of sunlight from the low elevation angle surface 43 entering the opposing surface 44 is increased, while the dispersion of sunlight from the high elevation angle surface 45 is reduced.

The wall portion 47 described in the second embodiment is exemplary. The wall portion 47 may be disposed at only one of, or both of, between the first lens portion 34 and the sunlight lens portion 42, and between the sunlight lens portion 42 and the second lens portion 35.

The sunlight lens portion 42 described in the fifth embodiment may be appropriately applied to the configurations of the first to fourth embodiments.

The invention claimed is:

1. An integrated device, comprising:
   an in-vehicle product fixed to a windshield of a vehicle; and
   a sunlight sensor integrated with the in-vehicle product, the sunlight sensor including
      a sunlight detection element that detects a sunlight amount by receiving sunlight entering the windshield, and
      a sunlight lens portion that guides the sunlight entering the windshield over a predetermined elevation angle range into the sunlight detection element such that the sunlight detection element detects a peak of the sunlight amount at a particular angle within the elevation angle range, wherein
   the sunlight lens portion includes a peak adjustment portion that adjusts the sunlight amount to be constant over a prescribed range within the elevation angle range, the prescribed range including the particular angle, the sunlight lens portion includes
- a low elevation angle surface for capturing light at low elevation angles within the elevation angle range,
- an opposing surface which is adjacent to the low elevation angle surface and which faces the sunlight detection element, and
- a high elevation angle surface for capturing light at high elevation angles within the elevation angle range, and the peak adjustment portion is a reflection surface adjacent to the high elevation angle surface and the opposing surface, the reflection surface being formed such that a portion of the light entering the sunlight lens portion is reflected at the reflection surface and guided into the sunlight detection element, and the reflection surface is connected to the opposing surface with an acute angle, and the reflection surface is connected to the high elevation angle surface with an obtuse angle.

2. The integrated device of claim 1, wherein
the sunlight lens portion includes
- a low elevation angle surface for capturing light at low elevation angles within the elevation angle range,
- an opposing surface which is adjacent to the low elevation angle surface and which faces the sunlight detection element, and
- a high elevation angle surface for capturing light at high elevation angles within the elevation angle range, and the peak adjustment portion is an uneven portion formed at least in a portion of the opposing surface closer toward the low elevation angle surface.

3. The integrated device of claim 1, wherein the opposing surface is formed as a concave spherical surface such that a cross section of the sunlight lens portion as sectioned along a surface configuration an elevation angle of the sunlight detection element is spaced away from the sunlight detection element.

4. The integrated device of claim 1, wherein the opposing surface is formed as a spherical surface such that a cross section of the sunlight lens portion as sectioned along a surface configuration an elevation angle of the sunlight detection element protrudes toward the sunlight detection element.

5. The integrated device of claim 1, wherein
the in-vehicle product is a rain sensor that includes
- a light emission element that emits light toward the windshield,
- a light reception element that receives light reflected at the windshield, and
- a light guiding lens portion that
  - guides the light emitted by the light emission element to the windshield, and
  - guides the light reflected at the windshield to the light reception element, the rain sensor detects that raindrops are adhered to the windshield based on an intensity of light received by the light reception element, the sunlight detection element is disposed between the light emission element and the light reception element, the sunlight lens portion is disposed between a first lens portion and a second lens portion of the light guiding lens portion, the first lens portion collecting the light from the light emission element and the second lens portion collecting the light reflected at the windshield into the light reception element, and the sunlight lens portion is integrally formed with the light guiding lens portion.

6. The integrated device of claim 5, further comprising:
a wall portion disposed at one or both of between the first lens portion and the sunlight lens portion, and between the sunlight lens portion and the second lens portion.

7. The integrated device of claim 1, wherein the reflection surface, the opposing surface, and the high elevation angle surface form a continuous surface facing the sunlight detection element.

* * * * *